April 18, 1933.  F. M. POTTER  1,904,526
CABLE
Filed Feb. 4, 1928
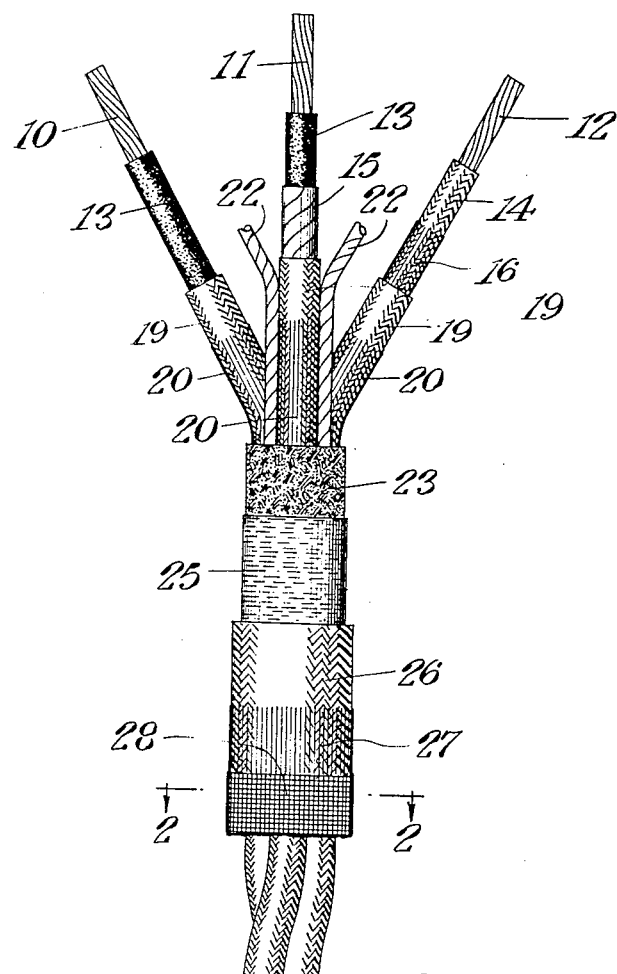
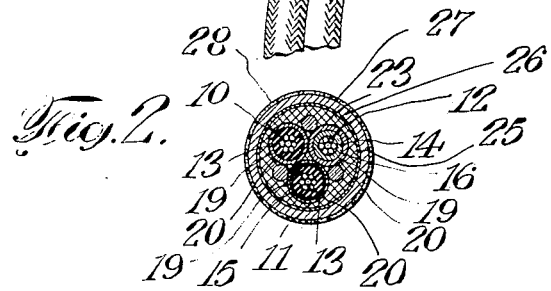
Inventor
Frank M. Potter
By his Attorneys
Emery, Booth, Janney & Varney Patented Apr. 18, 1933

1,904,526

UNITED STATES PATENT OFFICE

FRANK M. POTTER, OF ROME, NEW YORK, ASSIGNOR TO GENERAL CABLE CORPORATION, OF NEW YORK, N. Y., A CORPORATION OF NEW JERSEY

CABLE

Application filed February 4, 1928. Serial No. 251,766.

The present invention relates to insulated electric cables. The invention has been developed in connection with service or cutting in cables, i. e. cables adapted to be used for connecting consumers' premises with trunk cables on pole lines or analogous uses, so will be discussed in this relation but with a full realization that it may have various other applications.

Among the objects of the invention is the provision of electrical conductors or cables which will have high dielectric strength; which will have good mechanical construction; which will be extremely resistant to the effects of solar heat; which will be highly resistant to moisture even after long periods of service; which will not readily oxidize or rot; which will be inexpensive; and which in the enumerated and other respects will constitute a general improvement in the art.

Further objects of the invention will be apparent from the following description of the preferred embodiment thereof.

Trouble has been experienced in the use of plural conductor cables from rotting of the braid and rubber insulation. Cables of the above specified application usually have long free swinging spans with accentuated low points at the center of the span (or at one end, when the ends of the span are of unequal elevation) and moisture entering the cable moves along the valleys between conductors to the low point to cause rotting. Heretofore various fibrous materials such as jute have been employed to fill the valleys but these materials either when used alone or combined with any of the known waterproofing compounds have wicked moisture toward the low spots with the accustomed ill results. Also the valleys have been filled with various bituminous compounds or such as contain petroleum or asphalt pitches but these have soon become brittle and cracked so as to admit moisture to the surface of the conductors where being retained beneath the filler it would cause rotting of the cable.

According to the present invention the valleys of such cables are filled and the assembled conductors are completely sheathed by a putty or compound which effectually prevents the entry of moisture and wicking of the same toward low sections by reason of the fact that the compound is non-hygroscopic and retains its plastic or semi-fluid condition for unlimited periods of time and hence will not develop cracks;—that is, it has a low susceptibility factor. Should the cable covering crack or become punctured, the putty, because it thus maintains its plastic state, tends to flow or migrate toward the rupture and heal the same.

In addition to the water-resistant qualities possessed by the compound it is also extremely resistant to heat and oxidation since each individual substance used in the compound is almost completely oxidized before being combined.

Further and in conformity with the present invention each element of the cable has been selected to produce the maximum in desirable qualities at a minimum of expense and particular attention has been given to the surface covering of the cable. The surface braid of the cable cannot be thoroughly saturated with hard waxes such as are required to resist solar heat and the heat of weather,—or at best the cable may appear to be well saturated with such hard waxes when in reality it is not. This makes it desirable to use soft waxes. But such soft waxes are rapidly beaten out of the braid by weathering or are caused by solar heat to flow to the bottom of the cable. To retain these soft waxes in place a substance forming a tough weatherproof skin-like wrapper is hereby provided as will be described hereinbelow.

The accompanying drawing shows the preferred and illustrative form of the invention and therein:

Fig. 1 is a plan view having the several sheaths of material progressively removed to show the interior construction; and Fig. 2 is a cross section on the line 2—2 of Fig. 1.

In the drawing a three conductor cable is illustrated having metallic conductors 10, 11 and 12. Two of the conductors 10 and 11 are provided with a vulcanized rubber coating 13 while the third or neutral conductor 12 is provided with a braid 14 placed directly upon the metallic conductor. If desired, the third conductor may also be provided with a rubber sheath but it is, in most cases, only necessary that two of the conductors be rubber covered. One of the conductors for example 11 may be provided with colored kraft paper wrapping 15 which serves the purpose of identification. When the cable is of the two-conductor type, of course, both conductors will be rubber covered as 10 and 11 are here and also one of the conductors will be served with colored paper for the purpose of identification. In lieu of using colored paper for a wrapping a heavy thread may be included in the braid of one of the conductors for purposes of identification but paper covering is preferable since it furnishes some added dielectric strength and additional waterproofing between the conductors.

The braid over conductor 12 will be saturated with a compound which may be composed of asphalt, Montan wax and paraffin as shown at 16 to render it more waterproof. Over the rubber covering of the conductor 10, the paper wrapper of the conductor 11 and the saturated braid of the conductor 12 are now applied coverings 19 of braid, which braids are saturated with a waterproofing compound as indicated at 20 which may be similar to that indicated at 16. The conductors thus covered are assembled together ready to be bound into the cable. In the case of three-conductor cables or twisted two-conductor cables, the valleys between the conductors are supplied with jute strands 22 which have been pressure impregnated with a waterproofing compound which may include petrolatum, oxidized pitch, and coal tar asphalt. In the case of two conductor cable, however, the jute strand is omitted. In the valleys of the parallel two-conductor cable directly against the conductor coverings or in the valleys of the twisted two or three-conductor cable over the jute strand laid in the bottom thereof, an even coat of putty is applied. A sufficient amount of this putty is used to completely fill the valleys and provide a thin overall sheath for the several collected conductors. This material is indicated by the numeral 23.

The caulking compound or putty which has been mentioned may be composed of a base of a fatty acid pitch such as stearin pitch and a mineral filler such as asbestine (magnesium silicate). The asbestine which is in a finely divided state is added to the pitch in the amount required to give the desired consistency which preferably, at normal atmospheric temperatures is about like glazing putty and at 300° F. about like cold molasses. The amount of asbestine added will vary with the consistency of the pitch but will be between 10% and 30% of the whole. If a putty of a higher viscosity is desired as for filling the valleys of large conductor cables, fibre asbestos may also be added with the asbestine as a filler. Other mineral fillers, such as alumina, ground quartz, mica or magnesium oxide may be substituted for the magnesium silicate if desired. Since the putty maintains its fluidity, it follows that it tends to flow or migrate toward and heal any bruise or rupture which may be made to the completed cable.

If desired, a thin paper cover 25 may be applied over the sheath of oxidation and moisture-resistant putty, after which a cotton braid 26 is formed thereover. The thin paper cover 25 constitutes barrier or sealing means, tending to prevent the outward migration of the putty to the outer surface of the braid 26. The cotton braid 26 is impregnated with a stearin base or other suitable water-proofing saturant 27 and finally the cable is painted with a mineral oxide paint, for example iron oxide paint, to produce a thin tough surface coating 28 which is highly resistant to weathering and oxidation and which will prevent the saturant from being beaten out of the braid or being melted or disintegrated by heat and solar radiation so as to be allowed to flow toward the bottom of the cable. The metallic oxide paint, moreover, is opaque to ultraviolet rays, thereby affording the insulating material of the cable additional protection.

The embodiment of the invention described provides a compact structure which is relatively inexpensive to manufacture and yet possesses qualities which make the cable particularly well adapted for the purposes for which it is designed.

Although only one embodiment of the invention has been shown and described herein it will be understood that the invention may be variously modified and embodied within the scope of the sub-joined claims.

What I claim is:

1. An article of manufacture, comprising in combination, metallic electrical conductors, a vulcanized rubber sheath for one of said conductors, a waterproofed braid for another of said conductors, an identifying strand for one of said rubber covered conductors, a waterproofed braid over the above coverings for each of said conductors, a fibre strand partially filling the valleys between said conductors, an oxidation- and moisture-resistant compound completing the filling of said valleys and forming an overall sheath for said several conductors, said compound comprising stearin pitch and magnesium silicate, a binder covering of paper over said compound sheath, a braid over said paper covered compound, a thin wax saturating said braid and a skin of iron oxide paint over said wax saturated braid.

2. An article of manufacture comprising in combination, a plurality of conductors, an oxidation- and moisture-resistant compound filling the valleys between said conductors, a fibrous covering over said conductors and filling, a soft wax saturant for said fibrous covering and a skin of metallic oxide paint over said saturated fibrous covering.

3. An article of manufacture comprising in combination, a plurality of conductors, a strand in the valleys between said conductors, a plastic oxidation- and moisture-resistant compound over said strands completing the filling of said valleys, and a covering over said conductors and filling.

4. An article of manufacture comprising in combination, a plurality of conductors, and oxidation- and moisture-resistant compound filling the valleys between said conductors, said compound comprising a fatty acid pitch and a mineral filler, a fibrous covering over said conductors and filling, a soft wax saturant for said fibrous covering, and a skin of iron oxide paint over said saturated fibrous covering.

5. An article of manufacture comprising in combination, a plurality of conductors, a strand in the valleys between said conductors, an oxidation- and moisture-resistant compound over said strands completing the filling of said valleys, said compound comprising a fatty acid pitch and a mineral filler, and a covering over said conductors and filling.

6. An article of manufacture comprising in combination, a plurality of conductors, an oxidation- and moisture-resistant compound filling the valleys between said conductors, said compound comprising a fatty acid pitch and magnesium silicate, a fibrous covering over said conductors and filling, a soft wax saturant for said fibrous covering, and a skin of metallic oxide paint over said saturated fibrous covering.

7. An article of manufacture comprising in combination, a plurality of conductors having a valley therebetween, a fibrous strand in the valley between said conductors, an oxidation- and moisture-resistant compound completing the filling of said valley, said compound comprising a fatty acid pitch and a mineral filler, and a covering over said conductors and filling.

8. An article of manufacture comprising in combination, a plurality of metallic electrical conductors, rubber sheaths for said conductors, an oxidation- and moisture-resistant compound filling the valleys between and forming a jacket over said conductors, a fibrous covering over said conductors and jacket, a wax saturant for said fibrous covering, and a skin of iron oxide paint over said saturated fibrous covering.

9. The combination with a plurality of electrical conductors, of a covering therefor including a fibrous material in the valleys between said conductors and a compound for completing the filling of said valleys, said compound being resistant to heat and moisture and retaining its plastic state for indefinite periods of time.

10. An article of manufacture comprising, in combination, a plurality of electrical conductors, and a protecting covering therefor, said covering including a plastic oxidation- and moisture-resistant compound disposed in the valleys between said conductors and a tough, skin-like finishing paint for covering the whole.

11. In an article of manufacture, a plurality of electrical conductors, and a protecting covering therefor, including an oxidation- and moisture-resistant compound disposed in the valleys between said conductors, a jacket for enclosing said compound and saturated with relatively soft wax and a tough surface coating of paint over the whole for retaining said wax in position.

12. An article of manufacture, comprising, in combination, a conductor, and protecting means therefor including a sheath of a plastic oxidation- and moisture-resistant compound and a thin paper covering for said compound constituting sealing means therefor.

13. An article of manufacture comprising, in combination, a plurality of conductors having a valley therebetween, a fibrous material in said valley, and an oxidation- and moisture-resistant compound also positioned in said valley, said compound remaining plastic over prolonged periods of time and throughout wide temperature changes.

14. An article of manufacture comprising, in combination, a plurality of conductors having a valley therebetween, a fibrous material in said valley, and a coating of a plastic oxidation- and moisture-resistant compound over said conductors and extending into said valley so as to complete the filling thereof.

15. An article of manufacture comprising, in combination, a conductor, a covering therefor including a sheath of a migratory oxidation- and moisture-resistant compound, and barrier means tending to prevent the outward migration of said compound.

16. An article of manufacture comprising, in combination, a conductor, a protecting jacket for said conductor, a migratory oxidation- and moisture-resistant compound remaining plastic over prolonged periods of time and throughout wide temperature changes, a protective jacket over said compound, and barrier means tending to prevent the migration of said plastic compound to one of said jackets.

17. An article of manufacture comprising, in combination, a plurality of conductors having a valley therebetween, a fibrous material in said valley, a migratory oxidation- and moisture-resistant compound also positioned in said valley, a jacket surrounding the whole, and barrier means tending to prevent migration of said compound to said jacket.

18. An article of manufacture comprising, in combination, a plurality of conductors having a valley therebetween, a plastic oxidation- and moisture-resistant compound forming a coating for said conductors, a jacket surrounding the whole, and sealing means tending to prevent the migration of said plastic compound to said jacket.

19. An article of manufacture comprising, in combination, a plurality of conductors having a valley therebetween, a fibrous strand in said valley, a migratory oxidation- and moisture-resistant compound positioned in said valley and extending around said conductors to form a coating, an outer jacket and a paper-like barrier tending to prevent the migration of said compound to said jacket.

20. An article of manufacture comprising, in combination, a plurality of conductors having a valley therebetween, a fibrous strand in said valley, a migratory oxidation- and moisture-resistant compound positioned in said valley and extending around said conductors to form a coating, an outer jacket, barrier means tending to prevent the migration of said compound to said jacket, and a metallic oxide paint over the whole.

21. An article of manufacture comprising, in combination, a metallic conductor, and protecing means comprising a rubberized tape wrapping, a fibrous jacket having an oxidation- and moisture-resistant compound in immediate proximity thereto, a fibrous jacket having a waterproofing compound and a paint opaque to ultra-violet rays surrounding said protecting means.

22. An article of manufacture comprising in combination, an insulated metallic conductor, a self-healing oxidation- and moisture-resistant plastic compound around said conductor, a fibrous jacket over said compound, and a metallic oxide paint over said jacket.

In testimony whereof, I have signed my name to this specification this 2nd day of February, 1928.

FRANK M. POTTER.